United States Patent
Bertrand et al.

(10) Patent No.: US 7,025,161 B2
(45) Date of Patent: Apr. 11, 2006

(54) SNOWMOBILE WITH REAR ARRANGEMENT SUITABLE TO ACCEPT A TRANSPORTABLE OBJECT

(75) Inventors: Eric Bertrand, St-Elle-d'Orford (CA); Mathieu Gauthier, Sherbrooke (CA); Jean-Sebastien Pard, Tinwick (CA); Francis Nadeau, Rock-Forest (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 11/153,374

(22) Filed: Jun. 16, 2005

(65) Prior Publication Data

US 2005/0230167 A1 Oct. 20, 2005

Related U.S. Application Data

(63) Continuation of application No. 10/883,984, filed on Jul. 6, 2004, now Pat. No. 6,920,952.

(60) Provisional application No. 60/484,288, filed on Jul. 3, 2003.

(51) Int. Cl.
*B62M 27/02* (2006.01)

(52) U.S. Cl. ................. 180/190; 224/408; 296/37.1

(58) Field of Classification Search ............... 180/190, 180/182, 68.5; 224/408, 413; 114/55.57; 296/37.1

See application file for complete search history.

(56) References Cited

U.S. PATENT DOCUMENTS

| 3,785,541 | A | * | 1/1974 | Sibley ..................... 224/408 |
| 4,893,692 | A | * | 1/1990 | Smith ..................... 180/190 |
| 6,179,182 | B1 | * | 1/2001 | Hayes ..................... 224/408 |
| 6,749,036 | B1 | * | 6/2004 | Schrapp et al. ........... 180/190 |
| 2001/0040063 | A1 | | 11/2001 | Girouard et al. |
| 2001/0040064 | A1 | | 11/2001 | Girouard et al. |

FOREIGN PATENT DOCUMENTS

| CA | 2293106 | 6/2000 |
| CA | 2485813 | 6/2000 |

OTHER PUBLICATIONS

Ski-Doo, Parts Catalog-Safari LCE, GLX, 1990, Bombardier Inc., Canada.
Ski-Doo, Historical Catalog, 1999, J.Armand Bombardier Foundation and Bombardier Inc., Canada.

* cited by examiner

*Primary Examiner*—Tony Winner
(74) *Attorney, Agent, or Firm*—Osler, Hoskin & Harcourt LLP

(57) ABSTRACT

A snowmobile comprises a chassis including a tunnel, an engine disposed on the chassis at a forward end thereof and a seat disposed above the tunnel behind the engine. The seat has an inclined rear end face extending upwardly and rearwardly with respect to the upper surface of the tunnel, a cavity being defined beneath the seat between the inclined rear end face and the upper surface of the tunnel. The cavity is adapted to receive at least a portion of a transportable object therein, such that the transportable object is locatable above the tunnel at least partially beneath the seat.

14 Claims, 7 Drawing Sheets

SNOWMOBILE WITH REAR ARRANGEMENT SUITABLE TO ACCEPT A TRANSPORTABLE OBJECT

This application is a continuation of U.S. application Ser. No. 10/883,984 filed on Jul. 6, 2004 now a U.S. Pat. No. 6,920,952 B2. Through Ser. No. 10/883,984, this application also claims the benefit of priority to U.S. Provisional Application No. 60/484,288 filed on Jul. 3, 2003. The contents of the above-mentioned applications are incorporated herein by reference.

TECHNICAL FIELD

The present invention relates generally to a snowmobile having an arrangement for transporting an object thereon, and relates more particularly to a snowmobile having a rear seat and tunnel arrangement suitable for accepting a fuel container or a carrying bag.

BACKGROUND OF THE INVENTION

Snowmobiles commonly have a seat which ends, near the rear of the vehicle, with a substantially vertical end wall portion which can include the rear tail light. It is also known to provide a carry rack, defined on the rear portion of the tunnel behind this rear vertical wall portion of the seat, so that objects such as a small fuel tank or storage bag can be transported. Conventional seats also commonly include an internal compartment, integrated within the foam of the rear portion of the seat, which are adapted for storing small objects such as tools, first aid kits, etc.

When a small additional fuel tank, commonly called a Jerry can, is to be transported it is therefore situated in the rack disposed on the tunnel behind the flat rear end wall of the seat. The weight of such a full fuel container, which can be considerable, is accordingly carried on the very rear end of the tunnel, well behind the center of gravity of the snowmobile. This is disadvantageous as it can remove weight from the front skis, which can negatively affect the steering of the vehicle.

Additionally, fuel containers or storage bags which are transported on the rear of snowmobiles must be strapped down tight to the rear of the tunnel in order to ensure that they are securely retained in place, regardless of whether a rack is provided thereon or not. Such racks generally include small perimeter lips or rails which help locate the fuel container or storage bag on the tunnel, however these features are not sufficient to help retain the object in place. Accordingly, the user must properly fasten the object to the rear portion of the tunnel using straps, bungees or other similar securing means. Storage bags can be relatively awkward to securely fasten using straps due to their sometimes irregular shapes. Further, as full fuel containers are relatively heavy, they tend to work their way loose due to movement of the vehicle if not correctly fastened down. Therefore, careless fastening of the object secured to an open rack disposed on the rear of the tunnel behind the seat can result in unwanted displacement of the object, or even in complete loss thereof, during use of the snowmobile.

SUMMARY OF THE INVENTION

It is an object of the present invention to provide a snowmobile having a rear seat arrangement suitable for accepting at least a portion of a fuel container or a carrying bag therebeneath.

It is another object of the present invention to provide one of a fuel container and a carrying bag at least a portion of which is adapted for engagement beneath a rear seat of a snowmobile.

It is another object of the present invention to provide a fuel container fastening arrangement for securing a fuel container to the rear of a snowmobile.

Therefore, in accordance with the present invention, there is provided a snowmobile comprising: a chassis including a tunnel; an engine disposed on the chassis at a forward end thereof and a seat disposed on the tunnel behind the engine; two skis linked to the chassis by a front suspension system; a drive track disposed below the tunnel and being operatively connected to the engine for propulsion of the snowmobile; a steering device disposed on the chassis forward of the seat and being operatively connected to the skis for steering the snowmobile; the tunnel having an upper surface and a portion extending rearwardly beyond the seat; and the seat having an inclined rear end face extending upwardly and rearwardly from the upper surface of the tunnel, a cavity being defined beneath the seat between the inclined rear end face and the upper surface of the tunnel, the cavity being adapted to receive at least a portion of a transportable object therein, such that the transportable object is locatable above the tunnel at least partially beneath the seat.

There is also provided, in accordance with the present invention, an object transportable on a snowmobile comprising a seat disposed on a tunnel having a substantially flat upper surface extending rearwardly beyond the seat, the seat having an inclined rear end face extending upwardly and rearwardly from the upper surface of the tunnel, a cavity being defined beneath the seat between the inclined rear end face and the upper surface the object comprising a wedge shaped forward portion having a slanted upper surface corresponding to the inclined rear end face of the seat and being abutable thereagainst such that at least the forward portion of the object is receivable within the cavity, the object being thereby locatable above the tunnel at least partially beneath the seat.

There is also provided, in accordance with the present invention, a cap member suitable for a fuel container adapted for removable engagement to a snowmobile, the cap member having a shape corresponding to the fuel container such that the cap member is engageable thereto over at least one of a fuel conveying aperture and a venting aperture, the cap member being securable in place on the fuel container by at least one fastening strap also used to fasten the fuel container to the snowmobile.

There is further provided, in accordance with the present invention, a snowmobile in combination with an object transportable thereon, the snowmobile comprising: a chassis including a tunnel; an engine disposed on the chassis at a forward end thereof and a seat disposed on the tunnel behind the engine, the tunnel having an upper surface and a portion extending rearwardly beyond the seat; two skis linked to the chassis by a front suspension system; a drive track disposed below the tunnel and being operatively connected to the engine for propulsion of the snowmobile; a steering device disposed on the chassis forward of the seat and being operatively connected to the skis for steering the snowmobile; and the seat including a rear end portion defining a cavity therein, the cavity being rearwardly opening and being defined at least partially beneath the rear end portion between an end face thereof and the upper surface of the tunnel, the cavity being adapted to receive at least a portion of the object therein; and the object having at least a portion thereof shaped to correspond to the cavity such that the portion is receivable therein, the object being thereby locatable above the tunnel at least partially beneath the rear end portion of the seat.

BRIEF DESCRIPTION OF THE DRAWINGS

Further features and advantages of the present invention will become apparent from the following detailed description, taken in combination with the appended drawings, in which.

DETAILED DESCRIPTION OF THE PREFERRED EMBODIMENT

Figure 1:
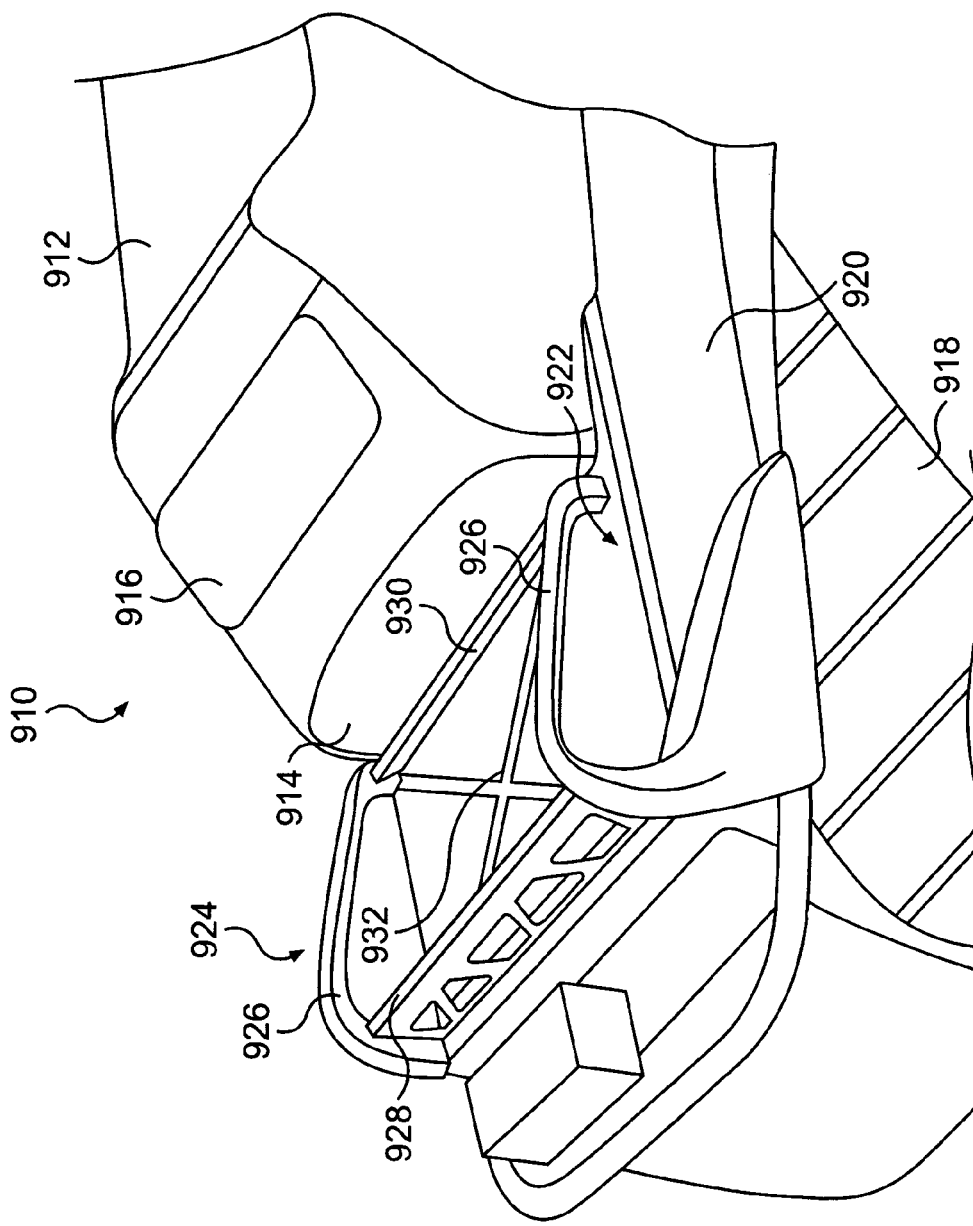
FIG. 1 is a perspective view of a rear portion of a snowmobile of the prior art.

FIG. 1 depicts a rear portion of a snowmobile 910 of the prior art. The snowmobile 910 comprises generally a seat 912 having, at the rear end thereof, a substantially vertical wall portion 914 which defines the rear end of the seat 912. An integral storage compartment is defined within the rear of the seat 912, to which the flip-up lid 916 provides access. A tunnel 920 extends beneath the seat 912 generally overtop of the track 918. The rear end of the tunnel 922 extends rearwardly beyond the vertical wall portion 914 of the seat 912, and includes a rack assembly 924 thereon. The rack assembly 924 comprises opposed side bars 926 on either lateral edge of the rear tunnel end 922 and has front and rear upstanding lips 930 and 928 respectively, which define a storage area 932 therebetween adapted to receive a transportable object such as a fuel container or a carrying bag. To secure such an object disposed in the storage area 932 to the rack assembly 924, fastening straps are typically used to tie down the fuel container or carrying bag.

Figure 2:
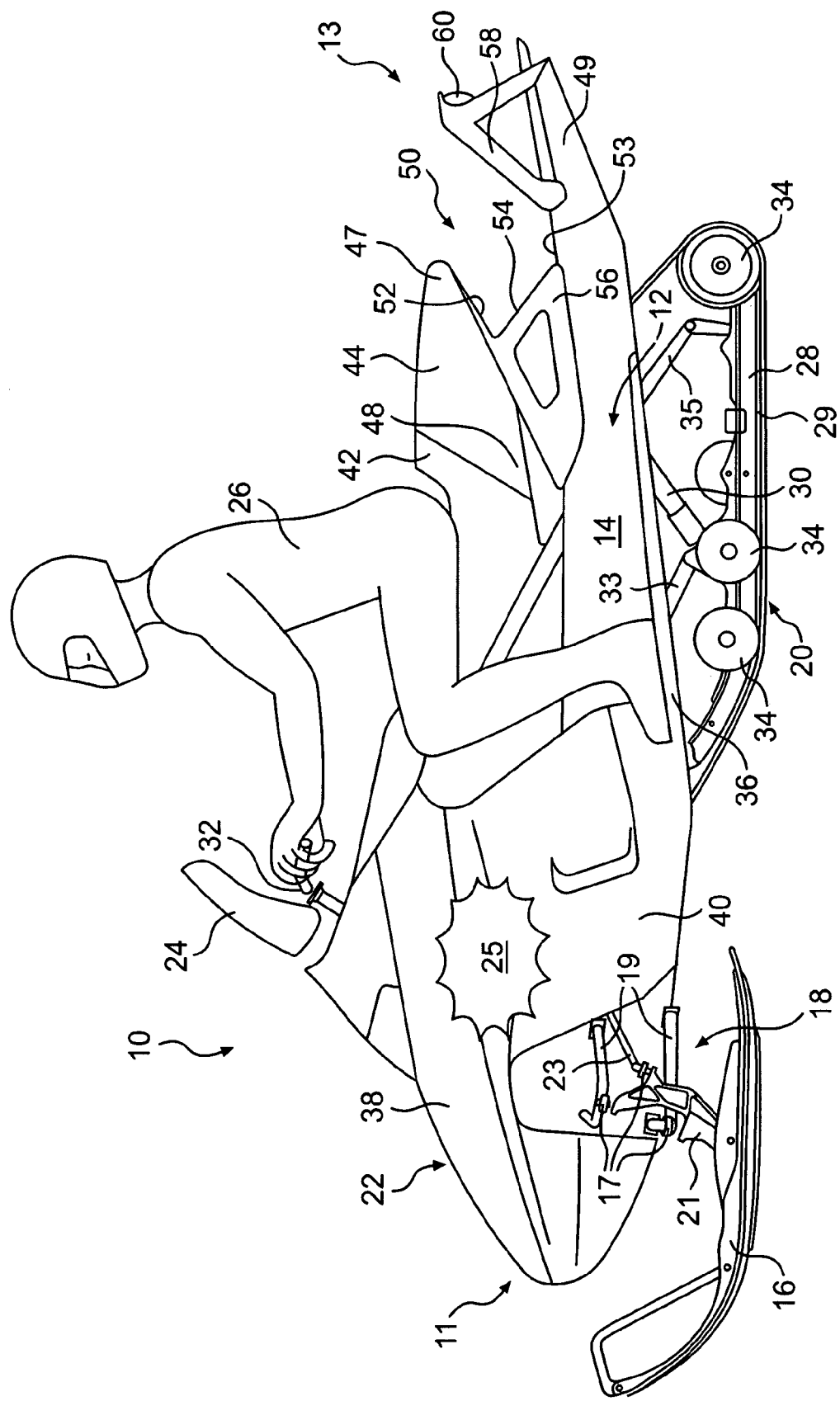
FIG. 2 is a side elevation sketch of a snowmobile in accordance with the present invention.

Referring now to FIG. 2, a snowmobile 10 in accordance with the present invention has a forward end 11 and a rearward end 13, defined consistently with a travel direction of the vehicle. The snowmobile 10 includes a chassis 12 which normally includes a rear tunnel portion 14, a front engine cradle portion (not shown), and a front suspension assembly portion (not shown). While the snowmobile 10 preferably uses a chassis 12, it is to be understood that a tubular frame portion could also be employed in stead of, at as well as, the chassis. While hidden behind the fairings 22 in FIG. 1, an engine 25, which provides motive force for the vehicle, is supported by the engine cradle portion of the chassis 12. In addition, two front skis 16 are attached to the forward end of the chassis 12 through a front suspension system 18. The front suspension system 18 generally comprises a double A-arm type suspension, having two A-arms arms 19 on either side of the vehicle, which link a ski leg 21 with the chassis 12. The ski legs 21 are attached the skis 16 at a lower end and to the upper and lower A-arms 19 at an upper end thereof. The ski leg 21 preferably includes three ball joints 17 at the attachment points with the upper and lower A-arms 19 and with the steering rod 23. The steering rod 23 rotates the ski leg 21 about an axis defined between the ball joints between the ski leg 21 and the A-arms 19, to rotate the skis 16. The steering rods 23 are linked to a steering device 32, such as a handlebar, which is positioned forward of a rider for providing directional control of the snowmobile 10. Thus, by turning the steering device 32, the ski legs 21 are pivoted, thereby turning the skis 16 to steer the vehicle in a desired direction.

A drive track 20 is disposed under tunnel 14 of the chassis 12 and is operatively connected to the engine 25 for propulsion of the snowmobile 10. A rear suspension system 27 comprises two parallel aluminum slide rails 28, which generally position and guide the endless drive track 20 and which include idler wheels 34 engaged thereto. The slide rails 28 include a slide 29 covering the lower surfaces thereof to reduce contact friction between the slide rails 28 and the drive track 20. The slide 29 is preferably made of Ultra High Molecular Weight Polyethylene (UHMWPE). The rear suspension system 27 also includes one or more shock absorbers 30, which may also include a coil spring. Forward and rear suspension arms 33 and 35 of the rear suspension system 27 attach the slide rails 28 to the chassis 12.

At the front of the chassis 12, the snowmobile 10 comprises an external shell including fairings 22 that enclose the engine 25 to protect it, and which can be decorated to render the snowmobile 10 more aesthetically pleasing. Typically, the fairings 22 comprise a hood 38 and one or more side panels 40. In the particular snowmobile 10 depicted, the side panels 40 open away from the snowmobile along a vertical axis, independently from the hood 38, which pivots forward about a horizontally extending axis. A windshield 24, which may be connected either to the fairings 22 near the forward end 11 of the snowmobile 10 or directly to the handlebars 32, acts as wind deflector to lessen the force of the air on the rider 26 when the snowmobile is moving. Two footrests 36, generally comprising part of the tunnel 14, are also positioned on either side of the central seat 42 to accommodate the rider's feet.

The seat 42, provided at the rearward end 13 of snowmobile 10 behind the engine 25, is mounted above the tunnel 14. A rear seat portion 44 is disposed behind the main seat 42, and may include an internal storage compartment. The rear seat portion 44 can be made either of rigid plastic, or can comprise foam if it is configured to provide a rear passenger seat. The rear seat 44 can therefore be either an integral continuation of the main seat 42, or can be a discrete member disposed immediately behind the seat 42. Even if the rear seat portion 44 is made of rigid plastic and does not provide a cushioned rear seating space for a passenger, it is still to be understood that the rear seat portion 44 as defined herein nevertheless comprises part of the seat of the snowmobile. A rear end portion 49 of the tunnel 14 extends rearwardly beyond the end of the rear seat portion 44.

Figure 3:
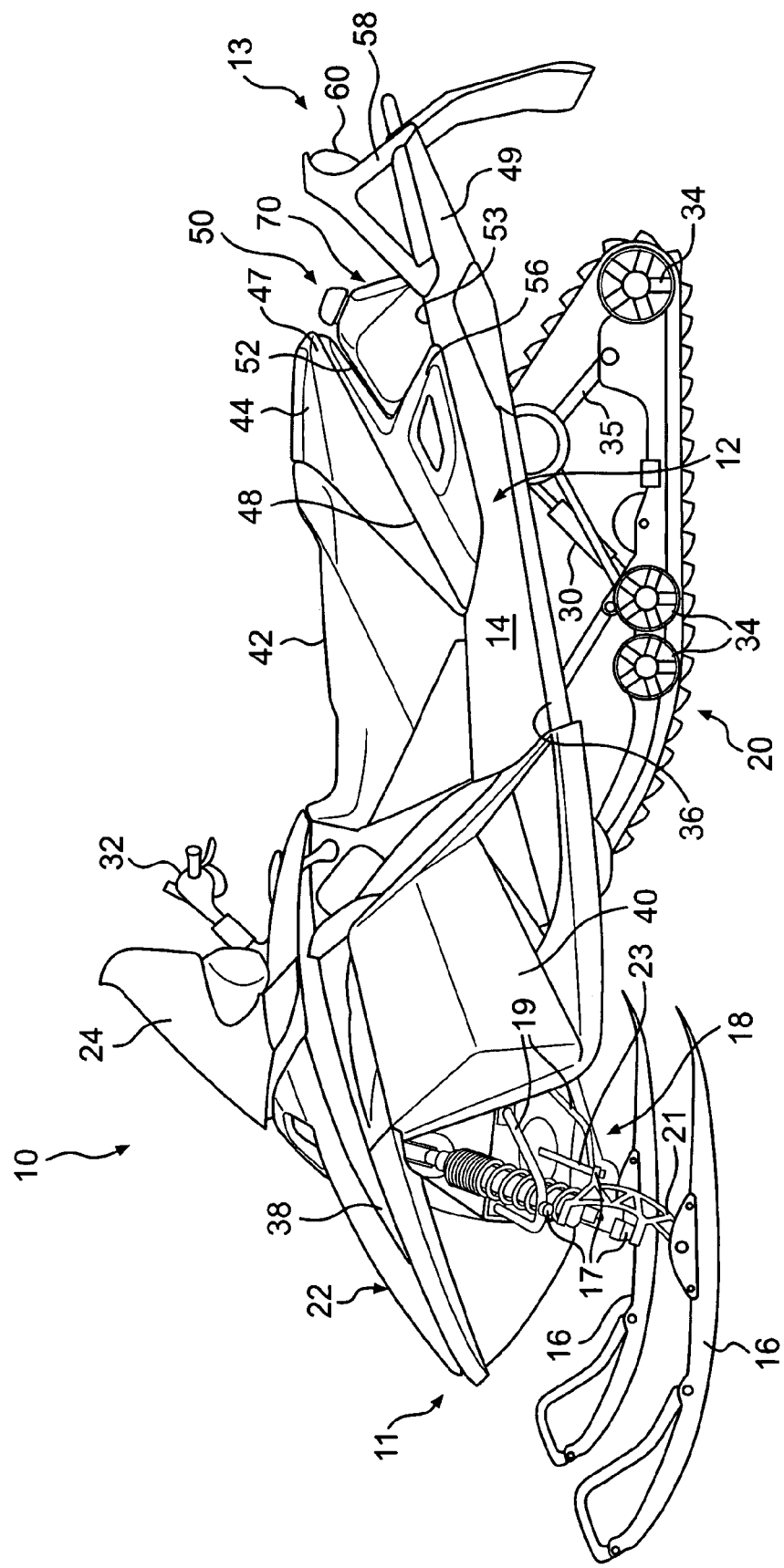
FIG. 3 is a perspective side view of a snowmobile in accordance with the present invention having a fuel container thereon.

An object transporting arrangement 50 is provided at the rearward end 13 of the snowmobile 10. The rear seat portion 44 has an inclined rear end face 52, which extends upwardly and rearwardly from an upper surface 53 of the tunnel 14, between a lower forward end 48 and an upper rear end 47 thereof. This inclined shape of the end of the rear seat portion 44 defines a cavity 54 therebeneath. The cavity 54 provides an object storage space beneath the rear seat portion 44 between the inclined rear end face 52 and the upper surface 53 of the tunnel 14, such that at least a portion of a transportable object such as a fuel container or a carrying bag is receivable therein. The generally "V"-shaped cavity 54 is therefore adapted to receive and help retain a fuel container or carrying bag near the rearward end 13 of the snowmobile 10, at least partially beneath the rear seat portion 44. Preferably, the fuel container or carrying bag used has a wedge shape defined by a forward slanted end which closely corresponds to the shape of the cavity 54, such it fits snugly therein. By closely matching the slant of the rear end face 52 of the rear seat portion 44 with that of the object, a relatively tight fit between the two is provided such that relative movement therebetween is limited. While the transportable object is preferably wedge shaped as described above, it is to be understood that the object and the cavity into which it is received can be any two complementary shapes. For example, the cavity can have an elliptical shape and the object can have a portion thereof which is correspondingly elliptical such that it will fit with the cavity. Regardless of the particular shape of the cavity defined in the rear portion of the snowmobile, the associated transportable object has a complementary shape such that it is snugly receivable within the cavity. A fuel container 70, as shown in FIGS. 3, and a carrying bag 80, as shown in FIG. 4, are preferably provided for use with the snowmobile 10 and will be described in greater detail below.

Such a seat and tunnel arrangement therefore allows the object to partially slide under the seat such that the seat helps retain the object more securely in place, preventing the fuel container or bag from sliding further forward or from vertical displacement. Also, this arrangement allows for the weight of the fuel container or bag to be located further forward on the snowmobile relative to conventional arrangements, such that the weight of the transported object is close to the center of gravity of the vehicle. This accordingly improves the steering and handling characteristics of the snowmobile. Further, by being disposed nearer to the center of gravity of the vehicle, the contents of the fuel container or carrying bag experience less jolting forces during regular operation of the snowmobile.

Side rail members 56 are preferably provided between the rear seat portion 44 and the tunnel 14 on either side of the cavity 54. These side rail members 56 help locate the fuel container or bag within the cavity 54, and help to laterally retain the object in place therein. A fastening strap is also preferably used to secure the object in place in the cavity, however the fastening strap need only extend around the rear portion of the object, forcing the wedge shaped forward end of the object into the "V"-shaped cavity 54. An upwardly extending tail rack member 58 is also preferably provided at the end of the rear tunnel portion 49. The molded plastic tail rack member 58 also includes a tail light 60 integral therewith.

Figure 4:
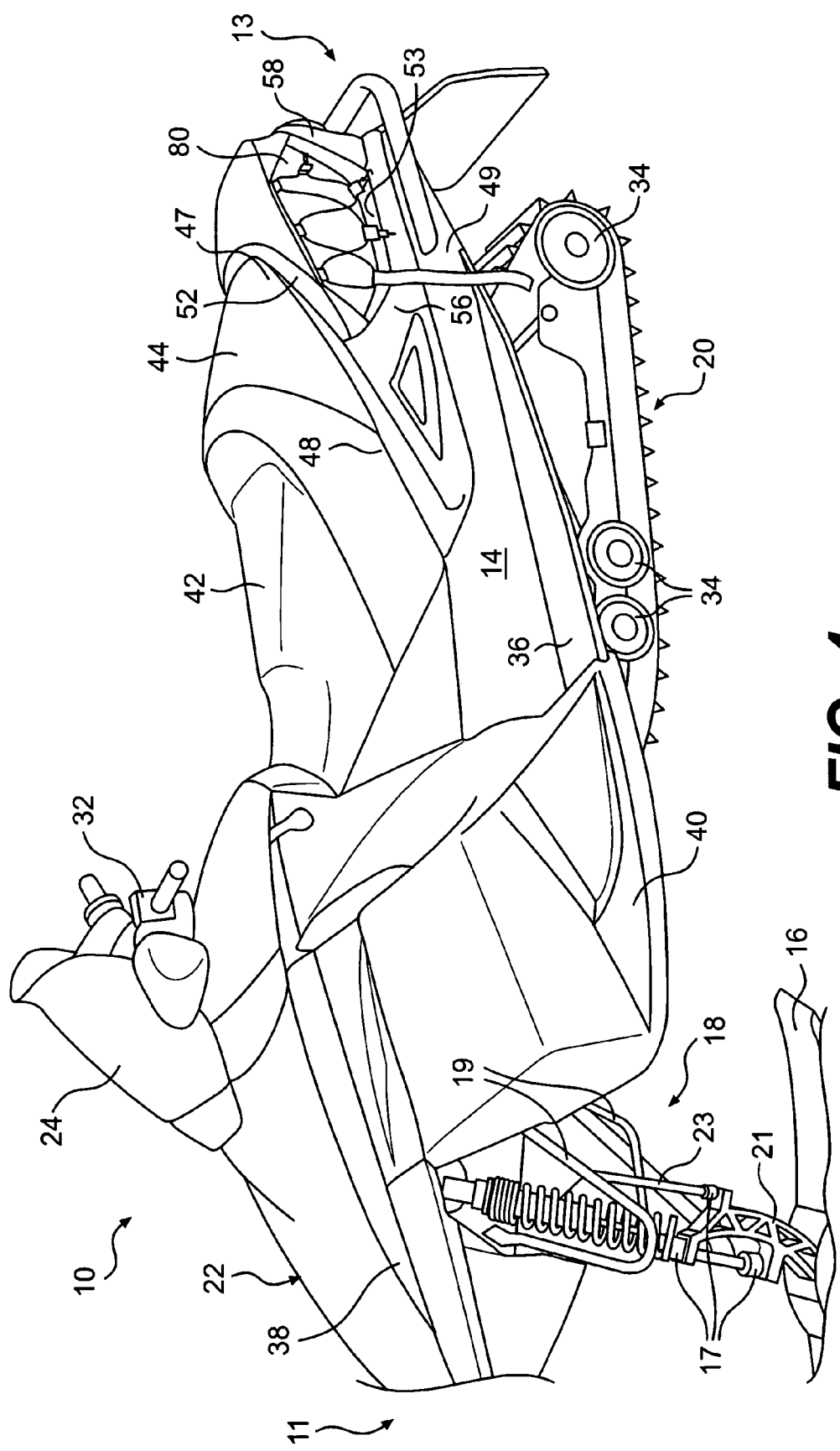
FIG. 4 is a perspective side view of a snowmobile in accordance with the present invention having a carrying bag installed thereon.
Figure 5:
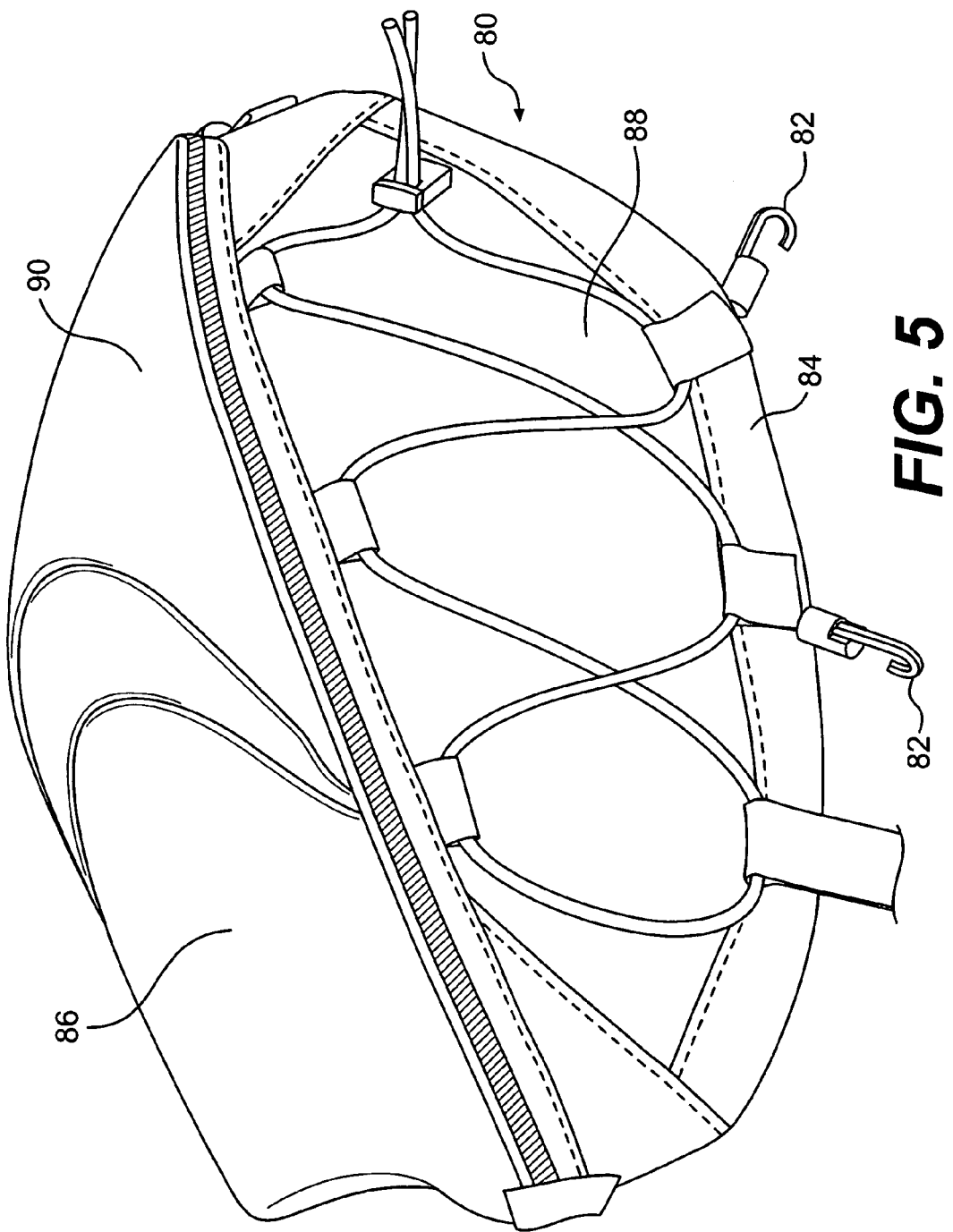
FIG. 5 is a perspective view of a carrying bag in accordance with the present invention, being receivable on the snowmobile of FIG. 4.

When a carrying bag 80 is attached to the rear of the snowmobile 10 behind the seat, as shown in FIG. 4, the rear tail rack member 58 securely retains the bag in place such that rearward movement of the bag is prevented. The bag is sized to fit snugly on the upper surface 53 of the tunnel 14 between the rear tail rack member 58 and the inclined rear end face 52 of the seat. Such a carrying bag 80, best seen in FIG. 5, is preferably at least semi-rigid, generally maintaining its wedge shape whether or not it is filled with articles to be transported therein, such as tools, food, clothing, emergency supplies, etc. The carrying bag 80 comprises a plurality of fastening clips 82 along the bottom edges 84 which permit quick and easy engagement and removal of the bag 80 from the snowmobile 10. Preferably, the bag 80 has a generally flat top surface 86 which is slanted toward the front end of the bag to match the inclined rear end face 52 of the seat. The slanted top surface 86 is engaged to the side walls 88 of the bag by a zipper 90, which permits the top portion of the bag 80 to be flipped open to fill or empty the bag. As the top portion of the bag must be flipped open to gain access to the interior of the bag 80, once inserted into the cavity 54, the inclined rear end face 52 of the seat ensures that the contents of the bag cannot fall out even if the user forgets to close the zipper 90 to seal the bag.

Figure 6A:
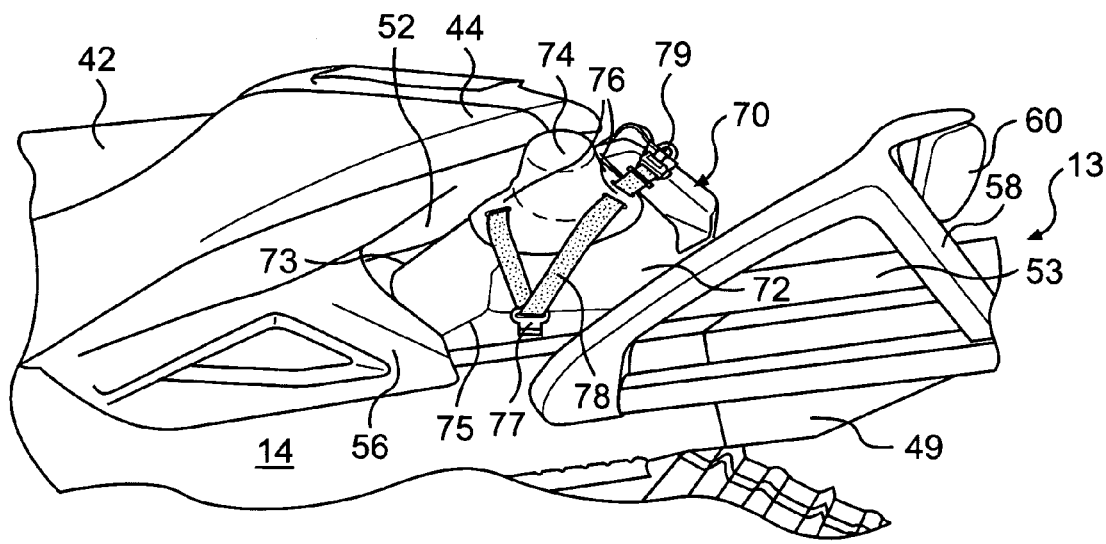
FIG. 6a is a perspective side view of the rear portion of the snowmobile of FIG. 3, having a fuel container of the present invention fastened thereto.
Figure 6B:
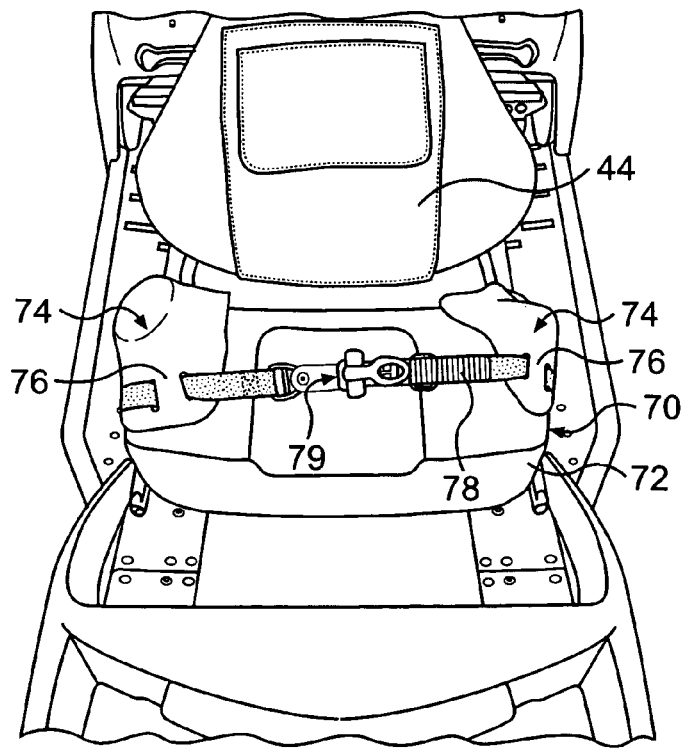
FIG. 6b is a top rear view of the rear portion of the snowmobile of FIG. 3, having the fuel container of the present invention fastened thereto.
Figure 7:
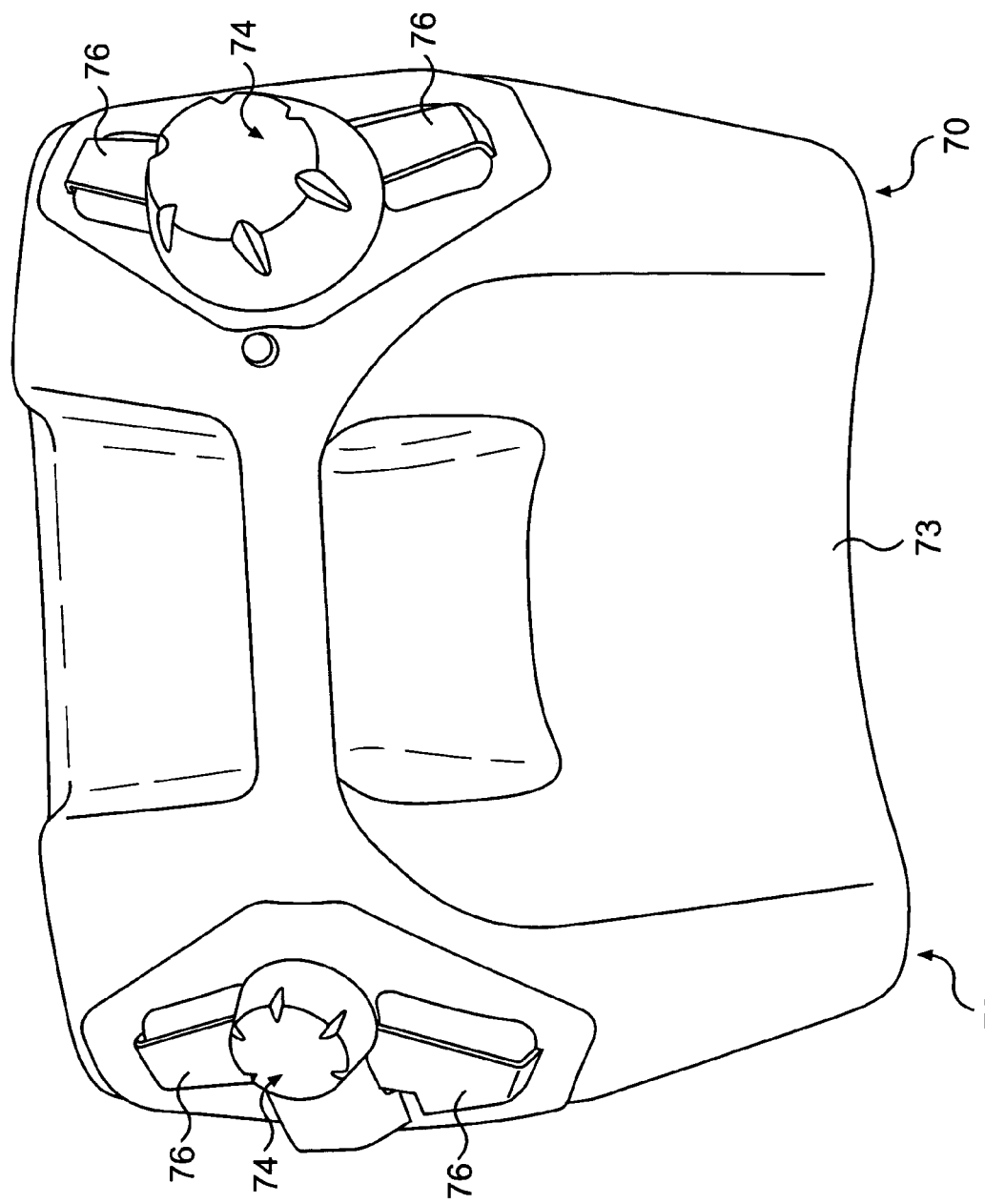
FIG. 7 is a top plan view of the fuel container assembly of FIGS. 6a and 6b.

Referring now to FIGS. 6a to 7, another aspect of the present invention is the fuel container assembly 70. The fuel container assembly 70 comprises generally a rigid fuel receiving reservoir 72 and cap members 74, which fit over the filling and breather apertures disposed on either side of the reservoir 72 at an upper portion thereof. The cap members are shaped to correspond to the reservoir 72, such that when the cap members 74 are placed of the apertures they do not slide off the reservoir 72. Each cap member 74 preferably includes two raised portions 76 which define fastening points in the form of channels which extend therethrough and through which at least one fastening strap 78 is fed. The fastening strap 78 retains the cap members 74 on the reservoir 72 and fastens the fuel container assembly 70 to the tunnel 14 of the snowmobile 10. Preferably, a single continuous fastening strap 78 is used. Clips 77, engaged to the fastening strap 78, are securable to rings 75 permanently fixed to the tunnel 14 on either side of the fuel container assembly 70. In order to facilitate access to the fastening strap 78 and its attachment to the tunnel 14, the attachment point rings 75 are located on the right and left sides of the tunnel 14, which corresponds to the front and back ends of the transversely mounted fuel reservoir 72. However, these attachment point rings 75 could also be disposed along the center of the tunnel 14, such that they are disposed on the right and left sides of the reservoir 72. The opposed ends of the continuous fastening strap 78 are attached together using a ratchet fastening mechanism 79, which permits the fastening strap 78 to be tightened to securely fastened the fuel container assembly 70 in place on the tunnel 14. Preferably, the rings 75 which are fixed to the tunnel 14 are located slightly forward of the position in which the fuel container assembly 70 is to be located on the tunnel 14, such that the slanted forward face 73 of the reservoir 72 is forced into abutment with the inclined rear end face 52 of the rear seat portion 44.

The cap members 74 which fit over both apertures in the fuel reservoir 72 ensure that the fuel container assembly 70 cannot be fastened to the snowmobile 10 with the poring spout, which connects to the fuel conveying aperture and is used to pour fuel from the fuel container into the vehicle when the fuel container is being used to dispense fuel therefrom, extending outward from the reservoir 72. Some snowmobile users have been known to fasten a fuel reservoir to their snowmobiles with the pouring spout still extending therefrom, in order to save refuelling time at the next fill-up. However, a protruding pouring spout can become ensnared on branches or other objects during operation of the snowmobile, causing it to break and leak fuel. The spill of fuel onto the vehicle can be dangerous and fuel spilled into the environment can cause numerous environmentally damaging effects. To avoid these occurrences, the cap members 74 ensure that the fuel container assembly 70 cannot be fastened to the snowmobile 10 without the pouring spout having been removed therefrom. Further, the cap members 74 also prevent the conventional screwed sealing caps, which plug the apertures in the reservoir 72 and over which the cap members 74 are disposed, from becoming unscrewed.

The embodiments of the invention described above are intended to be exemplary. Those skilled in the art will therefore appreciate that the forgoing description is illustrative only, and that various alternatives and modifications can be devised without departing from the spirit of the present invention. For example, while preferably employed on a snowmobile, the object transporting arrangement 50 of the present invention, can similarly be used on other straddle seated type vehicles, such as personal watercraft, all-terrain vehicles, motorcycles, etc. Accordingly, the present is intended to embrace all such alternatives, modifications and variances which fall within the scope of the appended claims.

The invention claimed is:

1. A snowmobile comprising:
    a chassis including a tunnel having an upper surface;
    an engine disposed on the chassis;
    a drive track disposed below and supported by the tunnel and operatively connected to the engine for propulsion of the snowmobile;
    two skis mounted to the chassis, each via a front suspension;
    a straddle seat disposed on the tunnel above the drive track and rearward of the engine, the seat having a rear end with a rear end face, the rear end face being inclined upwardly and rearwardly with respect to the upper surface of the tunnel;
    a steering device disposed on the chassis forward of the seat and operatively connected to the two skis for steering the snowmobile;
    a cavity defined beneath the seat between the inclined rear end face and the upper surface of the tunnel, the cavity being adapted to receive at least a portion of a transportable object therein, the transportable object being locatable above the tunnel at least partially beneath the seat.

2. The snowmobile as defined in claim 1, wherein the transportable object comprises one of a fuel container or a carrying bag.

3. The snowmobile as defined in claim 1, wherein attachment points are provided on the snowmobile such that the transportable object, disposed in the cavity, is removably fastenable to the snowmobile using a fastener.

4. The snowmobile as defined in claim 3, wherein the attachment points are provided on the tunnel.

5. The snowmobile as defined in claim 1, wherein an upwardly projecting tail rack is mounted on the tunnel rearward of the seat.

6. The snowmobile as defined in claim 1, wherein side members are provided on either side of the snowmobile between the seat and the tunnel and define the cavity therebetween.

7. An object transportable on a snowmobile comprising a seat disposed above a tunnel having a substantially flat upper surface, the seat having an inclined rear end face extending upwardly and rearwardly with respect to the upper surface of the tunnel, a cavity being defined beneath the seat between the inclined rear end face and the upper surface, the object comprising a wedge-shaped portion having a slanted upper surface corresponding to the inclined rear end face of the seat and being abutable thereagainst such that at least the portion of the object is receivable within the cavity, the object being thereby locatable above the tunnel at least partially beneath the seat.

8. The object as defined in claim 7, wherein the object comprises one of a fuel container and a carrying bag.

9. The object as defined in claim 7, wherein the object comprises attachment points, the attachment points cooperating with at least a fastener on the snowmobile for securing the object to the snowmobile.

10. The object as defined in claim 9, wherein the fastening member includes a fastening strap, the fastening strap forcing the object forward towards the inclined rear end face of the seat when the object is located on the snowmobile.

11. The object as defined in claim 10, wherein a ratchet mechanism is provided to tighten the fastening strap, thereby fastening the object to the tunnel.

12. The object as defined in claim 7, wherein the object is a carrying bag comprising an opening extending at least partially around a rear portion thereof beneath the slanted upper surface, the slanted upper surface comprising part of a forwardly pivoting lid of the carrying bag.

13. The object as defined in claim 7, wherein the object is a semi-rigid carrying bag.

14. A snowmobile in combination with an object transportable thereon, the snowmobile comprising:
    a chassis including a tunnel having an upper surface;
    an engine disposed on the chassis;
    a drive track disposed below and supported by the tunnel and operatively connected to the engine for propulsion of the snowmobile;
    two skis mounted to the chassis, each via a front suspension;
    a straddle seat disposed above the tunnel above the drive track and rearward of the engine, the seat having a rear end with a rear end face, the rear end face being inclined upwardly and rearwardly with respect to the upper surface of the tunnel;
    a steering device disposed on the chassis forward of the seat and operatively connected to the two skis for steering the snowmobile;
    a cavity defined beneath the seat between the inclined rear end face and the upper surface of the tunnel, the cavity being adapted to receive at least a portion of the object therein;
    the object having at least a portion thereof shaped to complement the cavity such that the portion is receivable therein, the object being thereby locatable above the tunnel at least partially beneath the rear end face of the seat.

* * * * *

(12) EX PARTE REEXAMINATION CERTIFICATE (9245th)
United States Patent
Bertrand et al.

(10) Number: US 7,025,161 C1
(45) Certificate Issued: *Aug. 28, 2012

(54) SNOWMOBILE WITH REAR ARRANGEMENT SUITABLE TO ACCEPT A TRANSPORTABLE OBJECT

(75) Inventors: Eric Bertrand, St-Elle-d'Orford (CA); Mathieu Gauthier, Sherbrooke (CA); Jean-Sebastien Pard, Tinwick (CA); Francis Nadeau, Rock-Forest (CA)

(73) Assignee: Bombardier Recreational Products Inc., Valcourt, Quebec (CA)

Reexamination Request:
No. 90/011,902, Sep. 12, 2011

Reexamination Certificate for:
Patent No.: 7,025,161
Issued: Apr. 11, 2006
Appl. No.: 11/153,374
Filed: Jun. 16, 2005

( * ) Notice: This patent is subject to a terminal disclaimer.

Related U.S. Application Data

(63) Continuation of application No. 10/883,984, filed on Jul. 6, 2004, now Pat. No. 6,920,952.
(60) Provisional application No. 60/484,288, filed on Jul. 3, 2003.

(51) Int. Cl.
*B62M 27/02* (2006.01)

(52) U.S. Cl. .................. 180/190; 224/408; 296/37.1
(58) Field of Classification Search ................ None
See application file for complete search history.

(56) References Cited

To view the complete listing of prior art documents cited during the proceeding for Reexamination Control Number 90/011,902, please refer to the USPTO's public Patent Application Information Retrieval (PAIR) system under the Display References tab.

*Primary Examiner* — Catherine S. Williams

(57) ABSTRACT

A snowmobile comprises a chassis including a tunnel, an engine disposed on the chassis at a forward end thereof and a seat disposed above the tunnel behind the engine. The seat has an inclined rear end face extending upwardly and rearwardly with respect to the upper surface of the tunnel, a cavity being defined beneath the seat between the inclined rear end face and the upper surface of the tunnel. The cavity is adapted to receive at least a portion of a transportable object therein, such that the transportable object is locatable above the tunnel at least partially beneath the seat.

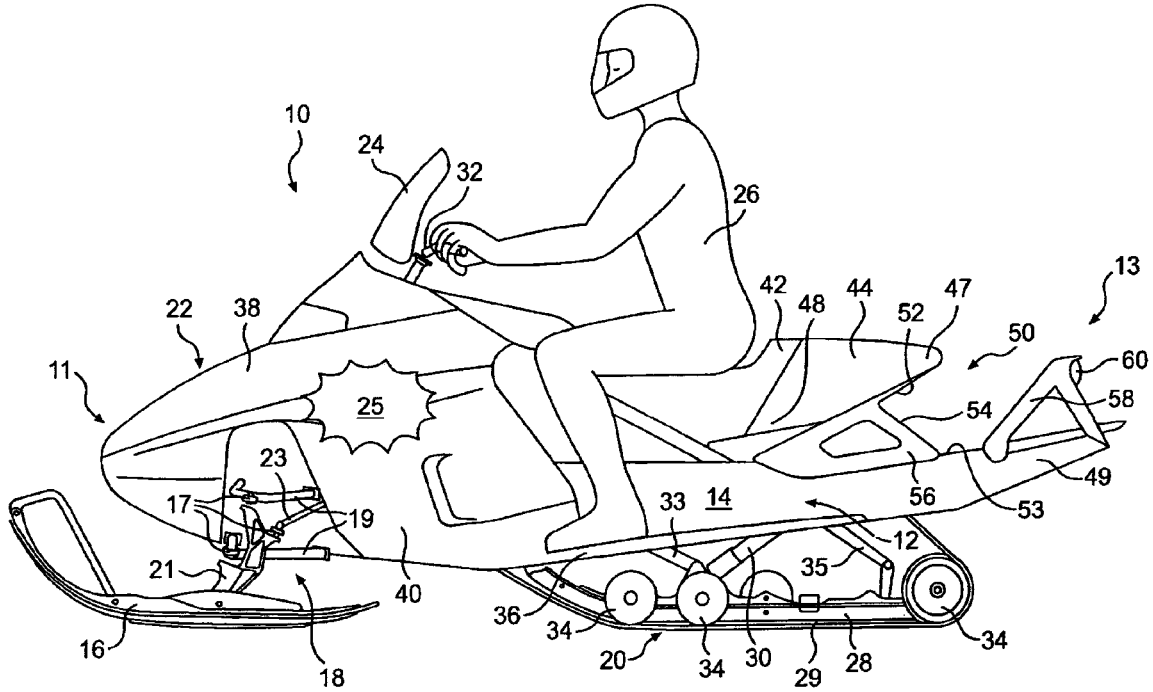

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-14 is confirmed.

New claims 15-46 are added and determined to be patentable.

15. *The snowmobile as defined in claim 1, wherein the portion of the transportable object is wedge-shaped having a slanted upper surface corresponding to the inclined rear end face of the seat and being abuttable thereagainst when the portion is received within the cavity.*

16. *The snowmobile as defined in claim 15, wherein when the portion is received within the cavity and the slanted upper surface of the object abuts the rear end face of the seat, a relatively tight fit between the slanted upper surface of the object and the rear end face of the seat occurs such that relative movement between the object and the seat is limited.*

17. *The snowmobile as defined in claim 15, wherein when the portion is received within the cavity and the slanted upper surface of the object abuts the rear end face of the seat, a relatively tight fit between the slanted upper surface of the object and the rear end face of the seat occurs helping to retain the object within the cavity.*

18. *The snowmobile as defined in claim 15, wherein when the portion is received within the cavity and the slanted upper surface of the object abuts the rear end face of the seat, the object is prevented from sliding forward or from vertical displacement as a result thereof.*

19. *The snowmobile as defined in claim 15, wherein the cavity is generally "V"-shaped and the wedge-shaped portion of the object corresponds closely to the shape of the cavity such that the object fits snugly in the cavity.*

20. *The object as defined in claim 7, wherein the object is sized such that when the object is received within the cavity and the slanted upper surface of the object abuts the rear end face of the seat, a relatively tight fit between the slanted upper surface of the object and the rear end face of the seat occurs such that relative movement between the object and the seat is limited.*

21. *The object as defined in claim 20, wherein the object is sized to fit snugly on the upper surface of the tunnel between the inclined rear end face of the seat and a snowmobile rear tail rack member.*

22. *The object as defined in claim 20, wherein the object has at least one clip permitting quick and easy engagement of the object to and removal of the object from the snowmobile.*

23. *The object as defined in claim 7, wherein the object is sized such that when the object is received within the cavity and the slanted upper surface of the object abuts the rear end face of the seat, a relatively tight fit between the slanted upper surface of the object and the rear end face of the seat occurs helping to retain the object within the cavity.*

24. *The object as defined in claim 23, wherein the object is sized to fit snugly on the upper surface of the tunnel between the inclined rear end face of the seat and a snowmobile rear tail rack member.*

25. *The object as defined in claim 23, wherein the object has at least one clip permitting quick and easy engagement of the object to and removal of the object from the snowmobile.*

26. *The object as defined in claim 7, wherein the object is sized such that when the object is received within the cavity and the slanted upper surface of the object abuts the rear end face of the seat, the object is prevented from sliding forward or from vertical displacement as a result thereof.*

27. *The object as defined in claim 26, wherein the object is sized to fit snugly on the upper surface of the tunnel between the inclined rear end face of the seat and a snowmobile rear tail rack member.*

28. *The object as defined in claim 26, wherein the object has at least one clip permitting quick and easy engagement of the object to and removal of the object from the snowmobile.*

29. *The object as defined in claim 7, wherein the cavity is generally "V"-shaped and the wedge-shaped portion of the object corresponds closely to the shape of the cavity such that the object fits snugly in the cavity.*

30. *The object as defined in claim 29, wherein the object is sized to fit snugly on the upper surface of the tunnel between the inclined rear end face of the seat and a snowmobile rear tail rack member.*

31. *The object as defined in claim 29, wherein the object has at least one clip permitting quick and easy engagement of the object to and removal of the object from the snowmobile.*

32. *The snowmobile in combination with an object transportable thereon as defined in claim 14, wherein the portion of the object is wedge-shaped having a slanted upper surface corresponding to the inclined rear end face of the seat and being abuttable thereagainst when the portion is received within the cavity.*

33. *The snowmobile in combination with an object transportable thereon as defined in claim 32, wherein the object is sized to fit snugly on the upper surface of the tunnel between the inclined rear end face of the seat and a snowmobile rear tail rack member.*

34. *The snowmobile in combination with an object transportable thereon as defined in claim 32, wherein the object has at least one clip permitting quick and easy engagement of the object to and removal of the object from the snowmobile.*

35. *The snowmobile in combination with an object transportable thereon as defined in claim 32, wherein when the portion is received within the cavity and the slanted upper surface of the object abuts the rear end face of the seat, a relatively tight fit between the slanted upper surface of the object and the rear end face of the seat occurs such that relative movement between the object and the seat is limited.*

36. *The snowmobile in combination with an object transportable thereon as defined in claim 35, wherein the object is sized to fit snugly on the upper surface of the tunnel between the inclined rear end face of the seat and a snowmobile rear tail rack member.*

37. *The snowmobile in combination with an object transportable thereon as defined in claim 35, wherein the object has at least one clip permitting quick and easy engagement of the object to and removal of the object from the snowmobile.*

38. The snowmobile in combination with an object transportable thereon as defined in claim 32, wherein when the portion is received within the cavity and the slanted upper surface of the object abuts the rear end face of the seat, a relatively tight fit between the slanted upper surface of the object and the rear end face of the seat occurs helping to retain the object within the cavity.

39. The snowmobile in combination with an object transportable thereon as defined in claim 38, wherein the object is sized to fit snugly on the upper surface of the tunnel between the inclined rear end face of the seat and a snowmobile rear tail rack member.

40. The snowmobile in combination with an object transportable thereon as defined in claim 38, wherein the object has at least one clip permitting quick and easy engagement of the object to and removal of the object from the snowmobile.

41. The snowmobile as defined in claim 32, wherein when the portion is received within the cavity and the slanted upper surface of the object abuts the rear end face of the seat, the object is prevented from sliding forward or from vertical displacement as a result thereof.

42. The snowmobile in combination with an object transportable thereon as defined in claim 41, wherein the object is sized to fit snugly on the upper surface of the tunnel between the inclined rear end face of the seat and a snowmobile rear tail rack member.

43. The snowmobile in combination with an object transportable thereon as defined in claim 41, wherein the object has at least one clip permitting quick and easy engagement of the object to and removal of the object from the snowmobile.

44. The snowmobile in combination with an object transportable thereon as defined in claim 32, wherein the cavity is generally "V"-shaped and the wedge-shaped portion of the object corresponds closely to the shape of the cavity such that the object fits snugly in the cavity.

45. The snowmobile in combination with an object transportable thereon as defined in claim 44, wherein the object is sized to fit snugly on the upper surface of the tunnel between the inclined rear end face of the seat and a snowmobile rear tail rack member.

46. The snowmobile in combination with an object transportable thereon as defined in claim 44, wherein the object has at least one clip permitting quick and easy engagement of the object to and removal of the object from the snowmobile.

* * * * *